(12) United States Patent
Otani et al.

(10) Patent No.: US 6,425,011 B1
(45) Date of Patent: Jul. 23, 2002

(54) ACCESS ADMINISTRATION METHOD AND DEVICE THEREFOR TO PROVIDE ACCESS ADMINISTRATION SERVICES ON A COMPUTER NETWORK

(75) Inventors: Koji Otani; Hiroyasu Sugano; Madoka Mitsuoka, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/365,829

(22) Filed: Aug. 3, 1999

(30) Foreign Application Priority Data

Oct. 16, 1998 (JP) .......................... 10-295356

(51) Int. Cl.[7] .......................... G06F 15/173
(52) U.S. Cl. ...................... 709/225; 709/229
(58) Field of Search ................... 709/225, 229

(56) References Cited

U.S. PATENT DOCUMENTS

| | | | | |
|---|---|---|---|---|
| 4,672,572 A | * | 6/1987 | Alsberg | |
| 5,261,102 A | * | 11/1993 | Hoffman | |
| 5,339,403 A | * | 8/1994 | Parker | |
| 5,742,683 A | * | 4/1998 | Lee et al. | |
| 6,157,953 A | * | 12/2000 | Chang et al. | 709/225 |
| 6,161,139 A | * | 12/2000 | Win et al. | 709/225 |
| 6,205,480 B1 | * | 3/2001 | Broadhurst et al. | 709/225 |

FOREIGN PATENT DOCUMENTS

| | | |
|---|---|---|
| JP | 5-53835 | 3/1993 |
| JP | 9-16523 | 1/1997 |

* cited by examiner

Primary Examiner—Krisna Lim
(74) Attorney, Agent, or Firm—Staas & Halsey LLP

(57) ABSTRACT

To reduce the burden of administering a service, thereby inducing utilization of the service. An access administration system includes a publisher DB 21, access data verification unit 24, access data determiner 25, access data issuing unit 1, an access submission unit 6. The publisher DB 21 stores publisher information pertaining to publishers who are authorized to issue predetermined access data. The access data verification unit 24 verifies the legitimacy of the access data received. The access determination unit 25 determines the access according to the access data received and a result of the verification, and reports the access to a service provision device. The access data issuing unit 1 generates access data. The access submission unit 6 sends access data to the access data verification unit 24. When access data can be granted to a user by a user that is not the publisher of the access data, it is preferred that the system includes a supplemental data issuing unit 3, which generates a supplemental data and appends the supplemental data to the access data, thereby creating a new access data. For verification of the legitimacy of the access data and supplemental data, it is preferable that digital signatures according to a public key encryption system be used.

15 Claims, 9 Drawing Sheets

Fig. 2

| DATA No. | 131 |
|---|---|
| URL | http://X/~I |
| ACCESS | FRIEND |
| ACCESS VALID UNTIL | JULY 31, 1999 |
| MAX. GRANT TIMES | 1 |
| USER'S PUBLIC KEY | A'S PUBLIC KEY |
| PUBLISHER'S SIGNATURE | I'S SIGNATURE |
| PUBLISHER | I |

Fig. 3

| DATA NO. | 131 | |
|---|---|---|
| URL | http://X/~I | |
| ACCESS | FRIEND | |
| ACCESS VALID UNTIL | JULY 31, 1999 | |
| MAX. GRANT TIMES | 1 | BASE ACCESS DATA |
| USER'S PUBLIC KEY | A'S PUBLIC KEY | |
| PUBLISHER'S SIGNATURE | I'S SIGNATURE | |
| PUBLISHER | I | |
| GRANTEE'S PUBLIC KEY | B'S PUBLIC KEY | SUPPLEMENTAL DATA 1 |
| GRANTOR'S SIGNATURE | A'S SIGNATURE | |
| GRANTEE'S PUBLIC KEY | C'S PUBLIC KEY | SUPPLEMENTAL DATA 2 |
| GRANTOR'S SIGNATURE | B'S SIGNATURE | |

Fig. 4

| PUBLISHER ID | PAGES HAVING AUTHORITY | PUBLIC KEYS |
|---|---|---|
| I | ~ I | I'S PUBLIC KEY |
| J | ~ J | J'S PUBLIC KEY |
| K | ~ K | K'S PUBLIC KEY |

Fig. 5

| PUBLISHER ID | INVALID DATA No. |
|---|---|
| I | 1,021 |
| J | 145,167 |

Fig. 6

| PUBLISHER | USER | CONFIDENCE | PUBLIC KEYS |
|---|---|---|---|
| I | A | 0.9 | A'S PUBLIC KEY |
|   | B | 0.8 | B'S PUBLIC KEY |
|   | ⋮ | ⋮ | ⋮ |

# ACCESS ADMINISTRATION METHOD AND DEVICE THEREFOR TO PROVIDE ACCESS ADMINISTRATION SERVICES ON A COMPUTER NETWORK

BACKGROUND OF THE INVENTION

1. Technical Field

The present invention relates to technology for changing computer network services depending on the user.

2. Description of Related Art

Conventionally in client (user)-server network computing systems, to determine user access for services administered by a server, the system that FIG. 11 illustrates has been largely used. The system depicted in FIG. 11 includes a server and a group of users using services provided by the server. As shown in FIG. 11, each server has a user database DB, an Access Control List database ACLDB, authorization means, and access determination means. Users are registered in the user database, and are assigned user IDs on the server as unique names. Access control lists, which correspond user IDs or user ID sets with access privileges for services, are stored in the ACLDB for each of the services. The authorization means verifies that a user is a legitimate registered user. The access determination means determines what sort of access privileges for services an authorized user holds. Access privileges for user utilization of services are determined in this system as follows.

(1) First, the system requests user identification, using a password or like authorization information and the user database, and authorizing a user by utilizing the authorization means.

(2) The system then determines access privileges using the access determination means. Searching the service ACLs, a record containing the user's ID is found and the access privilege written in the record decides the user's access.

Typically, however, a single user will use several servers among a plurality of servers administered by the same organization, complicating the method of determining access privileges outlined above. Furthermore, when changes in user, access privileges or services arise, the user DB and ACLDB on the server concerned have to be updated. The work of thus updating and meanwhile maintaining consistency in the several databases is not only time-consuming and costly, but is liable to give rise to errors.

Herein, applications such as the "Kerberos" security system for client/server computing, provided on access administration servers exclusively for authorization and access administration, have been advocated. The access administration server executes operations to determine user authorization and an abstract access level, i.e., access privilege, and then issues access data certifying the access status the administration server has determined. The application server does not conduct individual authorizations, but determines access privileges using access data. FIG. 12 illustrates the concept of a system wherein this sort of method is utilized. The system shown by FIG. 12 is composed of an access administration server, an application server group that provides services, and a user group. A user who is to use a service must obtain access privilege data from the access administration server, and submit the data to the application server that provides the service.

The access administration server includes a user database, authorization means, and first issuing means. User names, and access designators that express users' access on the application servers, are described by the user database. Access designators, one type of which are user IDs, abstractly describe user access. The authorization means confirms that a user is a properly registered user. The first issuing means issues access data.

The application server includes an ACL database, access data verification means, and access privilege determination means. In the ACL database are the afore-mentioned ACLs for every service. The access data verification means verifies whether access data is proper, and whether a user is a legitimate holder of the access data. The access privilege determination means determines actual access privileges.

When a user is going to use a service, the system shown in FIG. 12 determines access privileges by the procedures below.

(1) The user initially accesses the access administration server and obtains access data. The process therein is as below.

Utilizing the authorization means, the administration server authorizes a user using authorization information such as a password. The user then submits access data request. Utilizing the first issuing means, the administration server searches the user database seeking the user's access privilege designator in a designated application server and issues to the user access data containing the access privilege data sought.

The issued access data contains information for preventing illegitimate service use.

(2) The user then submits the access data to the application server. Utilizing the access data verification means, the application server verifies the legitimacy of the access data. The application server then verifies that the user is a legitimate holder of the access data using information in the access data.

(3) Once the access data is verified as being legitimate, the application server determines access privilege using the access privilege determination means as follows. Initially, the ACL is searched with the access privilege designator in the access data. The access denoted by the ACL record found is the user's access.

By using this method, users may be added or deleted, and user access altered, just by updating the access administration server database, which makes updating less trouble and errors less likely to occur.

Nevertheless, with conventional methods, all users have to be registered, even with methods by which access privileges are determined using an access administration server. Therefore, when there are many users, the burden of updating the databases is the burden of the small number of administrators who administrate the access administration servers. Consequently, problems as below occur.

Users using a server once or short-term only users, and users for whom access changes frequently, for example, bring about frequent updating of the user database, placing a large burden on the administrators and moreover readily inviting administrative errors.

On the other hand, administrators have been inclined to impose application procedures on the users in order to facilitate administration. This makes necessary procedures consequently bothersome from the user's point of view, and moreover makes it take a lot of time to obtain access.

Further, even wherein a service is put under its own administration, to give access to the service, users must be registered in the user database on the administration server by applying to the server administrator. Naturally, the administrator cannot register users without accessing the administration server. Therefore, for self-administrating services to grant access requires a means of accessing the administration server either directly or remotely, and a lot of time and effort.

Further still, depending on the type of service, users who have been given access privileges sometimes want to give the access privileges to a third party whom the users permit. Herein, with conventional methods, this requires the time and effort of accepting an application from a user and transmitting the application to the administration server administrator to have the third party registered.

SUMMARY OF THE INVENTION

An object of the present invention is to address the afore-noted problems by simplifying access administration to relieve the burden on administrators and at the same time curtail the time and effort users need to obtain access privileges.

In view of the above problems, an access administration method according to claim 1 is a method for administering user categories for a service. The service has different service contents corresponding to different user categories. The method is to be conducted by a party who provides at least one service content of the service. The method comprises steps of providing access data containing information pertaining to an access for accessing the service; issuing the access data to parties who use the service; receiving access data from one of the parties; sending an acknowledgement to the party; and providing a service content that corresponds to the access data to the user when the user requests the service.

A service provider who provides a service on his/her own, such as a creator of a so-called Web Page, issues access data to users who wish to access the service. An access privilege designator to access the service is written on the access data. The service provider herein means an owner of the service, instead of a server that administers the service provided. The users request an access to the service by sending access data. If the access data sent by the user tuns out to be legitimate, then a service content corresponding to the access written in the access data is provided. For example, when the service is about providing Web Pages and the access is "friend", a Web Page designated to "friends" will be provided. If the service is about providing financial information and the access is "referral", then financial information service is provided for free for a short period of time.

An access administration system according to claim 2 is adapted to be used in conjunction with a service provision device for providing the service to terminals on a computer network. The access administration system administers user categories of a service, where the service having different service contents corresponding to different user categories. The access administration system comprises publisher storing means, verifying means, access determining means, first issuing means, and license submission means.

The publisher storing means stores predetermined publisher information pertaining to publishers, the publishers being authorized to issue access data for at least one of the service contents. The verifying means verifies the legitimacy of the access data based on the access data received and the publisher information, upon receiving the access data. The access determining means determines an access based on the access data received and a result of the verification of the access data, and reports the determined access to the service provision device. The first issuing means is adapted to be disposed in a terminal of a publisher. The first issuing means generates access data and issues the access data so as to be utilized by a terminal of the publisher. The license submission means submits access data to the access data verifying means when the service from the service provision device is requested.

A publisher I who owns the service and is authorized to issue access data issues access data using the first issuing means to a user who wishes to use the service owned by the publisher I. The way the access data is delivered to the user is not limited to a specific way, and can be through a floppy disk with the access data written thereon or through transmission via a computer network. The user to whom the access data is granted sends the access data to the verification means by use of the license submission means. The verification means verifies the legitimacy of the access data by checking whether the content of the access data has been modified, whether the publisher is legitimate, and whether the user is legitimate. If the access data turns out to be legitimate, then the access determining means sends the access determined from the access data to the service provision device such as a Web server.

An access administration system according to claim 3 is the access administration system as set forth in claim 2, and further includes second issuing means. The second issuing means is adapted to be disposed in a terminal which can utilize the access data, generates a predetermined supplemental data, appends the supplemental data to the access data, and issues the access data with the supplemental data appended thereto so as to be utilized by the terminal. The verifying means in the access administration system verifies the legitimacy of the access data with the supplemental data appended thereto.

When a supplemental data is included in the access data, the verifying means verifies the legitimacy of the supplemental data by checking the legitimacy of the grantor and the receiver of the supplemental data and also by checking whether the supplemental data has been modified.

An access administration system according to claim 4 is the access administration system as set forth in claim 2, and further includes invalid data storing means for storing information pertaining to access data invalidated by a publisher, and invalidation reporting means for reporting the access data to invalidate to the invalid data storing means.

To invalidate access data that has been already issued, an identification information of the access data and the publisher identification information have only to be reported to the invalid data storing means by use of the invalidation reporting means. The verifying means access data stored in the invalid data storing means as illegitimate.

An access administration system according to claim 5 is the access administration system as set forth in claim 2, and further includes confidence storing means and confidence registering means. The verifying means access administration system verifies the legitimacy of the access data based on the confidence information set for the user contained in the access data. The confidence storing means stores confidence information set by a publisher for a user with reference to the publisher and the user. The confidence registering means registers the confidence information set for the user to the confidence storing means.

For instance, confidence information is a decimal smaller than 1 and is stored with reference to the user, categorized by publisher in the confidence storing server. As an example, in a situation where confidence information stored in the confidence storing means are 0.9 for publisher I with regard to user A, and 0.8 with regard to user B, whereas no confidence information is registered with regard to C, If access data is granted to user C via users A and B, the confidence at user C is 0.9×0.8×1 =0.72. The legitimacy of the access data is verified by comparing the confidence information with an appropriate standard value. If, on the other hand, the access data is granted directly to user D without going through users A and B, and if the confidence information with regard to user D is not registered in the confidence storing means, then the confidence information for user D is set as 1, and also confidence at user D is 1.

An access administration system according to claim 6 is the access administration system as set forth in claim 2, wherein the access data includes information pertaining to expiration date on which the access data expires, and the verifying means further verifies the legitimacy of the access data based on the date on which the service is requested in comparison with the expiration date.

The publisher can set a time period within which a user can use the access data granted, by writing the expiration date thereon.

An access administration system according to claim 7 is the access administration system as set forth in claim 3, wherein the access data further includes a maximum number of parties which can utilize the access data, and the verifying means verifies the legitimacy of the access data based on the number of supplemental data added in comparison with the maximum number of parties which can utilize the access data.

The publisher who grants access data to a user can limit the number the user grants the access data to other users. If the number of supplemental data added exceeds the maximum number of parties which can utilize the access data, then the verifying means finds the access data illegitimate.

An access administration system according to claim 8 is the access administration system as set forth in claim 2, wherein the predetermined publisher information includes publisher identification information for identifying the publisher of the access data, and verification information for verifying the legitimacy of the access data.

The publisher identification information identifies the publisher uniquely. Examples of the publisher identification information include publisher ID and electronic certificates. Examples of the verification information include public keys that correspond to private keys of the publisher of the access data. If the public key is used as verification information of access data, the access data should include a digital signature of the publisher, and the digital signature should be based on a public key encryption system.

An access administration system according to claim 9 is the access administration system as set forth in claim 2, wherein the predetermined access data includes data identification information for identifying the access data, publisher identification information for identifying the publisher, service content specification information for specifying the service content to which the publisher grants access data, an access privilege designator being granted, user verification information for verifying the legitimacy of a party to whom the access data is granted, publisher verification information for verifying the legitimacy of the publisher, and content verification information for verifying the legitimacy of the content of the access data.

Examples of the data identification information include sequential numbers assigned to the incense data issued. Examples of the publisher identification information include publisher ID and electronic certificates. Examples of the service content specification information include, similarly to the above description, URLs of Web Pages provided by a Web server, and channel names provided in chat services. The publisher can set the access as any name, including "friend", "work-related." Examples of the user verification information include public keys of the user. The legitimacy of a user is verified using a pubic key by sending a random data to the user and obtaining the random data encrypted with a private key of the user. Upon decrypting the encrypted data, if the decrypted data is identical to the original data, then the legitimacy of the user is verified. Examples of the publisher verification information similarly include, similarly to the above description, the publisher ID and digital signature of the publishers. Examples of the content verification information include digital signature of the publisher applied to the data identification information, the publisher identification information, the service content specification information the user name, and the user verification information.

An access administration system according to claim 10 is the access administration system as set forth in claim 2, wherein the access data includes publisher identification information for identifying the publisher of the access data, and a public key that corresponds to a private key of the publisher according to a public key encryption system, or encryption information for obtaining said public key; and the access data includes data identification information for identifying the access data, the publisher identification information, service content specification information for specifying the service content to which the publisher grants access data, an access privilege designator being granted, a public key that corresponds to a private key of the access data according to the public key encryption system, or encryption information for obtaining said public key, and a digital signature of the publisher that corresponds to the encryption information according to the public key encryption system.

The legitimacy of the publisher and the content of the access data is verified using the public key of the publisher obtained from the publisher information, and the digital signature of the publisher contained in the access data. The legitimacy of the user is verified using the public key of the user obtained from the access data, similarly to the description above.

An access administration system according to claim 11 is the access administration system as set forth in claim 3, wherein the supplemental data includes grantor verification information for verifying the legitimacy of a party who grants the access data, and receiver verification information for verifying the legitimacy of a party to whom the access data is granted.

Examples of information to verify the legitimacy of the grantor include a digital signature of the grantor according to a public key encryption system. Examples of information to verify the legitimacy of the receiver include a public to key that corresponds to a private key of the receiver. For instance, in a situation where access data granted from publisher I to user A is further granted to user B, the legitimacy of the grantor is verified by verifying the digital signature of the user A in the supplemental data using the public key of the user A, which has been contained in the access data even before the supplemental data is added. The legitimacy of the user B is verified by first sending a random data to the user B, obtaining data which is the random data encrypted with the private key of the user B, decrypting the encrypted data with the public key of the user A in the supplemental data, and comparing the decrypted data with the original random data.

An access administration system according to claim 12 is the access administration system as set forth in claim 11, wherein the grantor verification information is a digital signature of the party who grants the access data according to a public encryption key system, and the receiver verification information is a public key that corresponds to a private key of the party who grants the access data with the supplemental data appended thereto.

The legitimacy of the grantor and the receiver of the supplemental data is verified similarly to the inventions in claims 9 and 10.

An access determination module according to claim 13 is adapted to be used in conjunction with a service provision device which provides the service to terminals on a computer network. The access determination module determines user categories of a service, where the service has different service contents corresponding to different user categories. The access determination module comprises publisher storing means, verifying means, and access determining means. The publisher storing means stores predetermined publisher information pertaining to publishers, the publishers being authorized to issue access data for accessing one of the service content. The verifying means verifies the legitimacy of the access data based on the access data received and the publisher information, upon receiving the access data. The access determining means determines an access based on the access data received and a result of the verification of the access data, and reports the determined access to the service provision device.

When a user to whom access data is granted by a publisher of a service sends the access data to the service provision device, the verifying means verifies the legitimacy of the access data by checking whether the content of the access data is modified, whether the publisher is legitimate, and whether the user is legitimate. If the access data turns out to be legitimate, the access determining means reports the access determined from the access data to the service provision device such as a Web server.

Access data issuing device according to claim 14 is adapted to receive information for generating access data that defines an access for accessing a service that is offered on a computer network, thereby generating access data based on the received information and issuing the access data so as to be utilized on the computer network. The access data issuing device comprises data identification information for identifying each access data, publisher identification information for identifying the publisher, service content specification information for specifying a service content to which the publisher grants access data, an access privilege designator being granted, user verification information for verifying the legitimacy of a party to whom the access data is granted, publisher verification information for verifying the legitimacy of the publisher, and content verification information for verifying the legitimacy of the content of the access data.

The access data issuing device receives predetermined information such as a public key of a user to whom access data is granted, thereby issuing access data. The access data can be issued in various ways, including by use of recording media or through a computer network.

A supplemental data issuing device according to claim 15 is adapted to receive access data that defines an access for accessing a service that is offered on a computer network, and information for generating a predetermined supplemental data. The supplemental data issuing device then generates a supplemental data based on the information, and issues a new access data from the access data received with a supplemental data appended thereto so as to be utilized by a terminal. The supplemental data issuing device comprises grantor verification information for verifying the legitimacy of the party who grants the access data and the supplemental data, and receiver verification information for verifying the legitimacy of the party to whom the license and the supplemental data are granted.

In other words, the supplemental data issuing device issues a new access data wherein a supplemental data is appended to an original access data, based on information such as a public key of the receiver and the original access data.

A computer-readable storage device according to claim 16 has an access determining program. The access determining program is adapted to determine an access for accessing a service where the service has different service contents corresponding to different user categories. The access determining device is adapted to be used in conjunction with a service provision device which provides the service to terminals on a computer network. The access determining program executes steps comprising of following A through C.

A: Predetermined publisher information pertaining to publishers is stored, the publishers being authorized to issue a predetermined access data for at least one of the service contents;

B: The legitimacy of access data is verified upon receiving the access data, based on the access data received and the publisher information.

C: An access is determined based on the access data received and result of the verification, and reported to the service provision device.

The computer-readable storage device operates in the same manner as in the invention according to claim 13.

A computer-readable storage device according to claim 17 has access data issuing program. The access data issuing program is adapted to execute steps including following A through C.

A: Pertinent information is received for generating access data that defines an access for accessing a service that is offered on a computer network.

B: Access data is generated based on the received information.

C: The access data is issued so as to be utilized on the computer network.

The access data includes data identification information for identifying the access data, publisher identification information for identifying the publisher, service content specification information for specifying a service content to which the publisher grants license; an access privilege designator being granted, user verification information for verifying the legitimacy of a party to whom the access data is granted, publisher verification information for verifying the legitimacy of the publisher, and content verification information for verifying the legitimacy of the content of the access data.

The computer-readable storage device operates in the same manner as in the invention according to claim 14.

A computer-readable storage device according to claim 18 has data adding program. The data adding program is adapted to execute steps including following A through C.

A: access data that defines an access for accessing a service that is offered on a computer network, and information are received for generating a predetermined supplemental data.

B: A supplemental data is generated based on the information.

C: A new access data is issued from the access data received and the supplemental data appended thereto so as to be utilized on a computer network.

The supplemental data includes grantor verification information for verifying the legitimacy of the party who grants the access data and the supplemental data, and receiver verification information for verifying the legitimacy of the party to whom the license and the supplemental data are granted.

The computer-readable storage device operates in the same manner as in the invention according to claim 15.

According to the present invention, the owner of the service grants access data to users who access the service, whereby a burden of administering the provision of the service is alleviated. It is also easier for users to use the service since procedures required to subscribe to the service is made easier.

The foregoing and other objects, features, aspects and advantages of the present invention will become more apparent from the following detailed description in conjunction with the accompanying drawings.

BRIEF DESCRIPTION OF THE DRAWINGS

FIG. 2 is an explanatory view of an example of a granted access data;

FIG. 3 is an explanatory view of an example of access data having a supplemental data;

FIG. 4 is an explanatory view of an example of information stored in the publisher DB;

FIG. 5 is an explanatory view of an example of information stored in the invalid data DB;

FIG. 6 is an explanatory view of an example of information stored in the confidence DB;

DETAILED DESCRIPTION OF THE PREFERRED EMBODIMENTS

An access administration system in accordance with the present invention is explained below while giving examples of embodiments.

Figure 1:
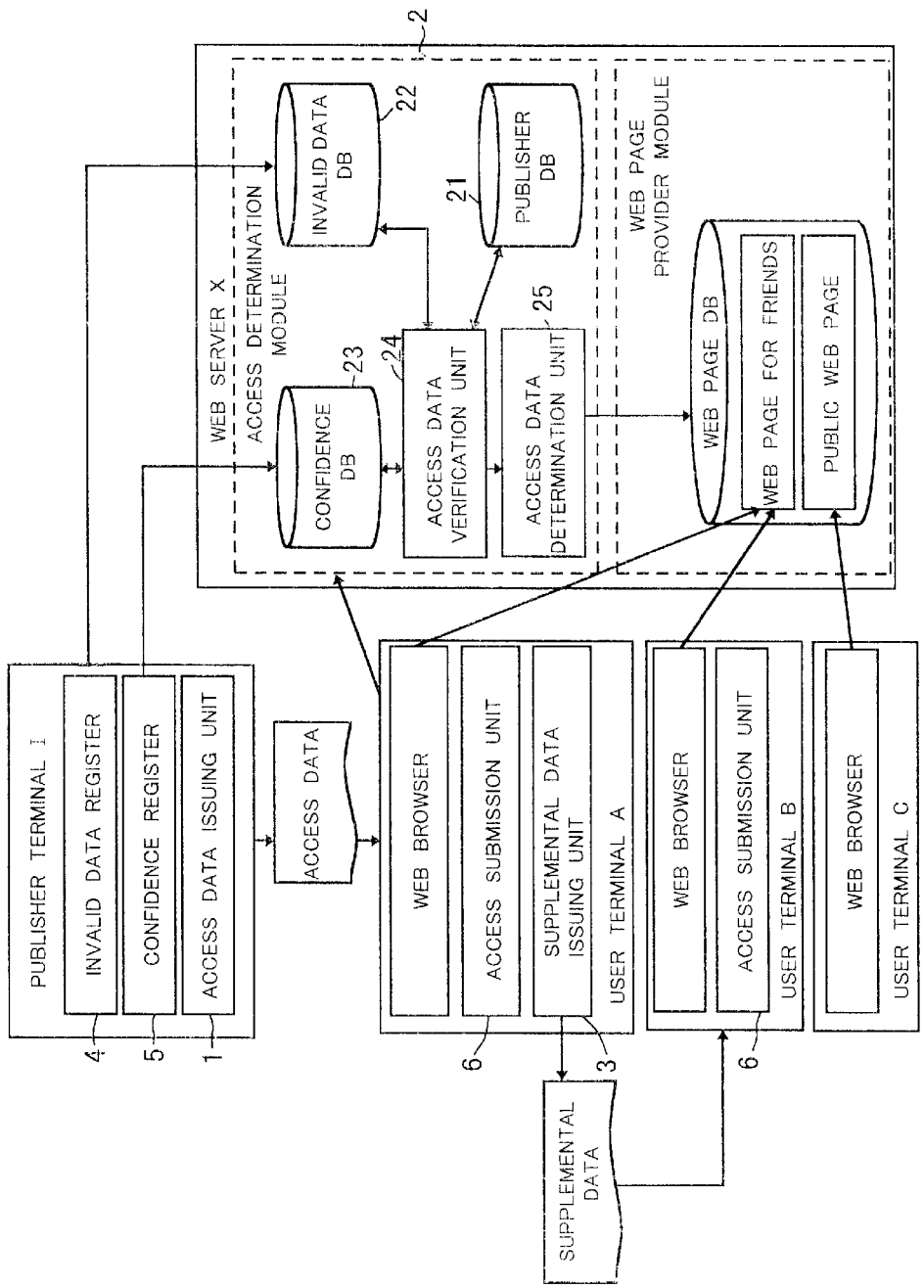
FIG. 1 is a block view to explain an access administration system according to the present invention.

FIG. 1 is an example of user Web-Page access administered utilizing an access administration system of the present invention. In this embodiment example, a public key encryption system is used on a digital signature. The public key encryption system is not particularly limited; a commonly utilized public key encryption system such as RSA, ElGamal, or elliptic curve encryption systems may be employed.

The access administration system in this embodiment at least includes access data issuing unit 1 disposed in a publisher's terminal; an access determination module 2, herein in a Web server X; and an access submission unit 6 in users' terminals. The access administration system can also have a supplemental data issuing unit 3 in the users' terminals, an invalid data register 4 in the Web server, and a confidence register 5 in the publisher's terminal.

The access data issuing unit 1 is part of an information terminal for publisher I (hereinafter publisher terminal I) in this embodiment. The access data issuing unit 1 creates and issues predetermined access data that is granted to other users. The publisher is a principal body that owns, creates, and provides services to users at large. The access data is described in detail later.

The Web server X (hereinafter server X) in which the access determination module 2 is provided includes a Web Page provider module. The Web Page provider module stores Web Pages in a Web Page DB, and provides the Web Pages to users' terminals as requested. The access determination module 2 determines a user's access privileges for the requested services, i.e., requested Web pages in this embodiment, determines the Web Pages to be provided to the user according to the access privilege determined, and then reports the Web Pages to the Web Page provider module. The access determination module 2 is described in detail later.

Access is granted to user-end information terminals in which the access submission unit 6 in this embodiment is provided. The access submission unit 6 sends access data to the access determination module 2 prior to or along with a request for a service. The user's terminal requests services from the server X and is capable of running applications such as a Web browser. When the access data is sent prior to the request for a service, the access submission unit 6 directs the Web browser to request that the service be provided in accordance with a command issued by the access determination module 2.

The supplemental data issuing unit 3 provided in the user-end information terminals in this embodiment adds predetermined supplemental data to the granted access data wherein it is to be further granted to another user. For instance, in FIG. 1, the supplemental data issuing unit 3 in user A's terminal creates supplemental data, adds the created supplemental data to the access data granted from the publisher terminal I, and grants it to user B's terminal. User B can access the Web Pages of publisher I with the access designator given to user A by sending the access data together with the supplemental data to the access determination module 2.

The invalid data register 4 disposed in the publisher terminal I accepts designations to invalidate access data items among the access data issued by the publisher, and registers the designations in the access determination module 2.

The confidence register 5 accepts settings signifying the publisher's confidence with regard to other users, which settings are registered in the access determination module 2. In this embodiment, the confidence is expressed as a decimal fraction 1 or less, with the confidence for a user whose confidence is not yet registered considered as being 1.

Access Data

The service-owning publisher grants access data created using the access data generator 1 to users who wish to use Web Pages that the publisher itself provides. In this embodiment, the publisher owns Web Pages. The publisher can grant access data to a user in various ways, including by giving to the user a floppy disk on which the access data is stored or by electronic mail transmission. FIG. 2 shows an example of access data granted from the publisher I to the user A.

The access data includes at least access data identifying information, information identifying the service provided, an access designator, a user's public key, the publisher's signature, and the publisher's ID. The access data in this embodiment further includes access data expiration date, and a maximum number of times the access data can be granted.

In this embodiment, a data number uniquely assigned to the access data when issued by the publisher identifies the access data. The data number enables the access data to be specified.

The information identifying the service provided specifies the Web Pages to which the publisher gives access privileges. In this embodiment, a URL is used as the Web Page identifying information.

The access designator assigns privileges for accessing Web Pages. Examples of access designators include "friend", "hobby pal," and "company-related."

The access data expiration data limits the term during which a user given the access data can access a Web Page.

Wherein users who have gained access data can distribute it to other users, the maximum grant times establishes a limit on the number of times access data issued from the publisher to a user can be granted to other users. Setting the maximum grant times to zero prevents the access data from being granted to other users apart from that to whom the publisher directly issued the access data.

The users' public keys correspond to the private keys of users who have received issued access data, and serve to verify the legitimacy of the users.

The publisher's signature is a digital signature that utilizes the publisher's private key. The digital signature applies to that portion of the access data excepting the digital signature itself and the publisher's name. The digital signature of the publisher enables verification of the legitimacy of the publisher and verification as to whether the access data has been doctored.

The publisher's IDs are granted uniquely from the Web server X to the large number of publishers having Web Pages. By comparing the publisher's ID in the access data with the publisher's ID that the Web server X administrates, the legitimacy of the publisher can be confirmed.

Supplemental Data

When the access data issued to user A by the publisher I, who provides the Web Pages, is granted by the user A to other users B, C, etc., supplemental data issued by the supplemental data issuing unit 3 is appended to the access data. FIG. 3 shows an example of access data to which supplemental data is appended. The supplemental data 1 in FIG. 3 is appended to the original access data when user A grants the access data to user B, whereas the supplemental data 2 is appended when user B further grants the access data to the user C.

The supplemental data includes at least the grantee's public key, and the digital signature of the grantor. The grantee's public key corresponds to the private key of the user who becomes the grantee. The grantee's public key is information for verifying the grantee's legitimacy, as likewise users' public keys within the access data are.

The grantor's digital signature is information for verifying the legitimacy of the grantor, and for verifying whether the supplemental data has been doctored or otherwise falsified. The subject of the digital signature, then, is the grantee's public key as well as the grantor's digital signature in the supplemental data last appended. If there is no one-previous supplemental data, the publisher's digital signature takes the place of the grantor's digital signature. For example, wherein access data has been granted from user A to user B, the subject of grantor A's digital signature becomes user B's public key or publisher I's digital signature. Grantor A's digital signature is verified by user A's public key within the access data.

Access Determination Module

The access determination module 2 includes a publisher database (DB) 21, an invalid data DB 22, a confidence DB 23, access data verification unit 24, and an access determination unit 25. In this embodiment, utilizing the access privilege designator noted by the access data as is as the Web Page access privilege, the access privilege works as a user category. Therefore, no ACL database is provided. Wherein a there are a number of access privileges corresponding to an access privilege designator, an ACL DB may be provided.

(1) Publisher DB

The publisher DB 21 stores information pertaining to publishers who are authorized to issue access data for accessing Web Pages. Such information includes at least a publisher ID, authorized Web Pages, and public keys of the publishers. FIG. 4 depicts a conceptual diagram of information stored in the publisher DB.

The publisher ID is uniquely assigned to each publisher in the server X for identifying each publisher. The publisher ID is used also within the access data.

The authorized Web Pages are information that specifies the Web Pages for which the publisher is authorized to issue access data. In this embodiment, the authorized Web Pages are the root pages of a tree of pages for which the publisher is authorized to issue access data. The publisher is authorized to issue access data for pages that are subordinate to the root pages based on the URL path names.

The public key of the publisher corresponds to the private key of the publisher. The public key of the publisher is used to verify the digital signature of the publisher in the access data, thereby verifying the legitimacy of the publisher and of the content of the access data.

(2) Invalid Data DB

The invalid data DB 22 assigns to the publisher access data that the publisher has designated by means of the invalid data register 4, and stores the assigned access data. Specifically, data numbers uniquely conferred to the access data are correlated with the publisher IDs and stored in the invalid data DB 22. FIG. 5 depicts a conceptual diagram of information stored in the invalid data DB 22.

(3) Confidence DB

The confidence DB 23 assigns to users as well as the publisher confidence levels set by the publisher by means of the confidence register 5, and stores the assigned confidence levels. Specifically, the publisher ID, user names, confidence levels, and users' public keys are correlated and stored in the confidence DB 23. The users' public keys are used as a key for searching whether a user, grantor or grantee among the access data is registered in the confidence DB 23. FIG. 6 depicts a conceptual diagram of the confidence DB 23. The publisher's confidence level with regard to a user whose confidence level is not registered in the confidence DB 23 is deemed to be 1. The confidence level is used to restrict provision of services to users who have been granted access by copying the access data repeatedly, or to restrict provision of the services according on the paths through which the access data is distributed.

(4) Access Data Verification Unit

The access data verification unit 24 verifies the legitimacy of the access data. That access data is legitimate means that its publisher as well as the user to whom the access data has been granted are legitimate; that access data expiration date and grant times are being obeyed; that a page for which access has been granted is included in pages for which the publisher has authority; and that the access data content has not been doctored or falsified.

(5) Access Determination Unit

The access determination unit 25 determines Web Page access privileges based on access data sent from a user who is trying to access the Web Pages, and reports the determination to the Web Page provider module. For a user who accesses the Web Pages without using access data, the access determination unit 25 grants a prescribed access privilege. The Web Page provider module sends Web Pages to users' terminals in response to the determined access privilege.

Process Flow Based on Access Data

Figure 7:
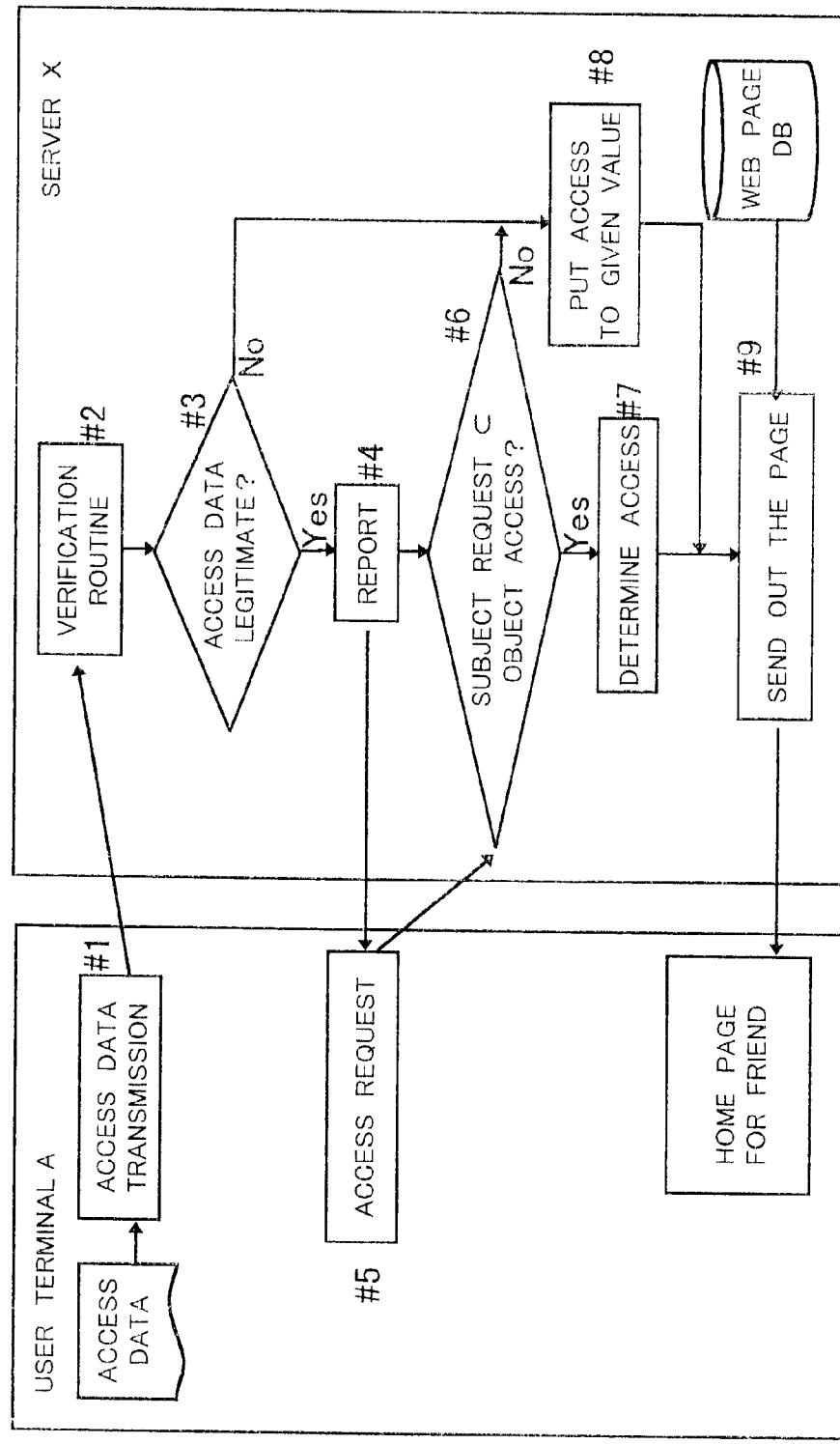
FIG. 7 is an explanatory view to show a process flow of the access administration system.

Process flow in the server X is explained below, taking a case as an example wherein user A having the previously noted access data accesses Web Pages. FIG. 7 is an explanatory view of process flow based on the access data. In this example, user A receives from the publisher I the access data as shown in FIG. 2 to access the Web Pages.

[1] Main Routine

Initially, the access data is sent from the access submission unit 6 of the user's terminal A to the server X (#1). The access determination module 2 verifies the legitimacy of the access data (#2). The access data verification routine (#2) will be described later.

If the legitimacy of the access data is verified (#3 is yes), the server X sends an acknowledgement to the terminal of the user A (#4) to report the result of the verification test, otherwise the access is set as a predetermined value (#8).

After receiving the acknowledgement, the user A's terminal sends a request for access to the Web Pages, from the Web browser therein to the server X (#5).

Upon receiving the request for access, the access determination unit 25 then determines the access in a following manner. Initially, the URL written in the access data of the user A is compared with the requested URL (#6).

If the requested URL is within the range of URLs specified in the access data, then the access is the access privilege designator in the access data (#7).

If the requested URL is not within the range of URLs in the access data, then the access is set as a predetermined value (#8). For instance, user categories such as "general" can be a predetermined value for users without a valid access privilege designator.

Then, based on the determined access and the requested URLs, data pertaining to corresponding Web Pages are retrieved from the Web DB, and are sent to the user A's terminal (#9). If the access is "friend," the user A's terminal will receive Web Pages directed to friends. If the access is "general," Web Pages for "general" will be returned.

[2] Process Flow of Access Data Legitimacy Verification

Figure 8:
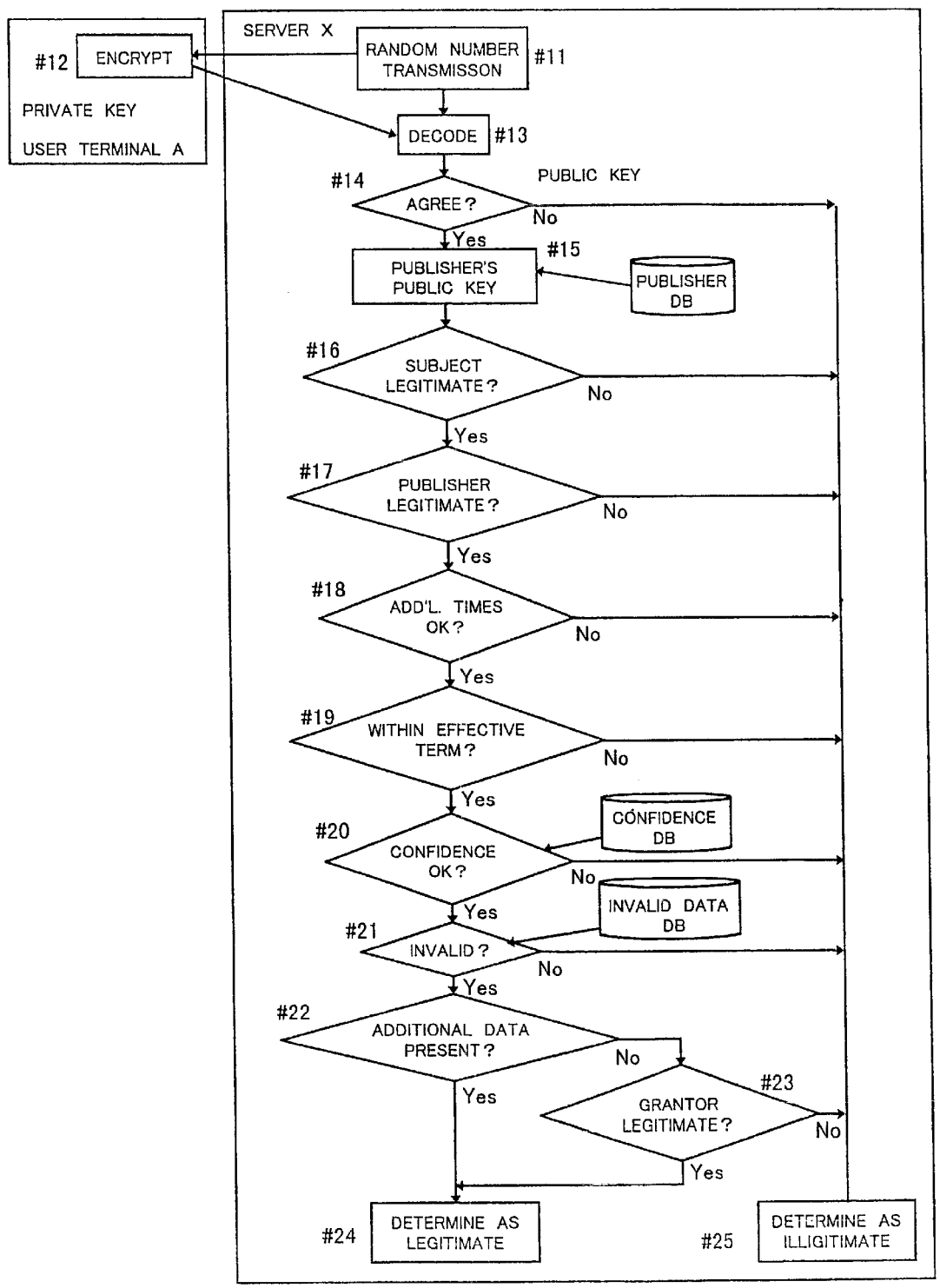
FIG. 8 is an explanatory view to show a process flow to verify the legitimacy of access data.

FIG. 8 shows an explanatory view of the flow of verification of the legitimacy of access data conducted by the access determination module 2. Once access data is sent from a user's terminal to the server X, the access determination module 2 executes the following process.

Initially, the access data verification unit 24 investigates whether the user A is a legitimate holder of the access data. The access data verification unit 24 generates random numbers, which are then sent to the user A's terminal (#11).

Upon receiving the random numbers, the user A's terminal encrypts the random numbers with the user A's private key, then sends the encrypted random numbers to the server X.

The access data verification unit 24 decrypts the encrypted random numbers with user A's public key, which is contained in the access data sent to the access data verification unit 24 earlier (#13). If there are more than one public keys in the access data, the access data verification unit 24 uses a public key that was appended last among the public keys of the users in the access data and the public keys of the grantees in the supplemental data. In this example, the user A's public key is used as a decryption key since there is no supplemental data.

The access data verification unit 24 then compares the decrypted random numbers and the original random numbers (#14). If the two random numbers are identical, the user A is considered a legitimate holder of the access data. If not, the access data is considered illegitimate (#25).

Once the legitimacy of the user A is verified, the access data verification unit 24 verifies the legitimacy of the content of the access data. The access data verification unit 24 searches the publisher DB 21 for a record of the publisher I using the publisher ID, to obtain the authorized Web Pages and the public key of the publisher I (#15). If the publisher's ID is not found in the publisher DB 21, the access data is illegitimate.

The access data verification unit 24 further compares "the authorized Web Pages" in the publisher DB 21 and the URLS in the access data (#16). If the URLs in the access data are not included in the authorized Web Pages, the access data is illegitimate (#25).

The access data verification unit 24 then verifies the digital signature of the publisher using the publisher's public key (#17). In this way, the legitimacy of the publisher is verified and it is examined whether the access data has been modified. If either the publisher turns out to be illegitimate or the access data turns out to have been modified, the access data is illegitimate (#25).

When the digital signature of the publisher is legitimate, the access data verification unit 24 counts the number of supplemental data items, and compares the number with "the maximum number of times the access data can be granted to other users" (#18). If the number of supplemental data items is greater than this maximum number, then the access data is illegitimate (#25).

The access data verification unit 24 also compares the current date and time with the expiration date of the access data (#19). If the current date or time is later than the expiration date, the access data is illegitimate (#25).

The access data verification unit 24 then verifies the confidence of the user A (#20). The access data verification unit 24 searches the confidence DB 23 for confidence levels for all the users in the access data and the grantees in the supplemental data, using the public keys thereof as a key for searching. In this example, the key is the user A's public key. If the public key is found in the confidence DB 23, the confidence level of the user is retrieved. In this example, the confidence level of the user A is 0.9. If the public key is not in the confidence DB 23, then the confidence for the user is set as 1. The access data verification unit 24 then multiplies the confidence of all the users and grantees. If the product is below a predetermined value, for instance 0.8, then the access data is invalid (#25).

The access data verification unit 24 then searches the invalid data DB 22 for a record of the publisher I, using the publisher ID in the access data as a search key. If a record containing the publisher ID is found in the invalid data DB 22, and if the record has a data number list in which the data number of the access data in question is included, then the access data is illegitimate (#25).

The access data verification unit 24 then examines whether the access data includes any supplemental data (#22). If the access data includes supplemental data, then the access data verification unit 24 examines "the digital signature of the grantee" in all the supplemental data. In other words, the legitimacy of the grantee and the supplemental data is verified (#23). More specifically, the legitimacy of "the digital signature of the grantor" is examined using "the grantee's public key" in the immediately preceding supplemental data. For the first supplemental data, "the user's public key" is used in lieu of "the grantee's public key" to verify the legitimacy of the grantor's digital signature. If the grantor's digital signature turns out to be illegitimate, the access data is illegitimate.

For example, when the access data issued from the publisher I to the user A is further granted to the user B by the user A, the grantor A's digital signature and the grantee B's public key are appended to the access data. By verifying the grantor A's digital signature with the user A's public key, which has been in the access data even before the supplemental data is appended, the legitimacy of the grantor A and the supplemental data is verified.

If the access data is not shown to be illegitimate in any of the invetigations described above, then the access data is legitimate (#24). If a user B who does not have access data sends a request for access to the service, then the request is processed in the following manner. The Web browser of the user B's terminal sends a request for access to the Web Pages to the server X. Upon receiving the request, the access determination module 2 sets the access privilege designator as a predetermined value and reports the access privilege designator to the Web Page provider module. In this example, the predetermined value is "general." The Web Page DB retrieves data based on the determined access privilege designator and the URLs in the access request, and sends the data to the user B's browser. In this example, data designed for general users in the Web Pages of the publisher I will be sent to the user B's browser.

According to the present invention, the administrator of the Web Pages can grant access data to access the Web Pages to other users as well as administer the access data, thereby reducing the burden on the administrators of the servers that administer Web Pages. At the same time, users can obtain access data easily.

Figure 9:
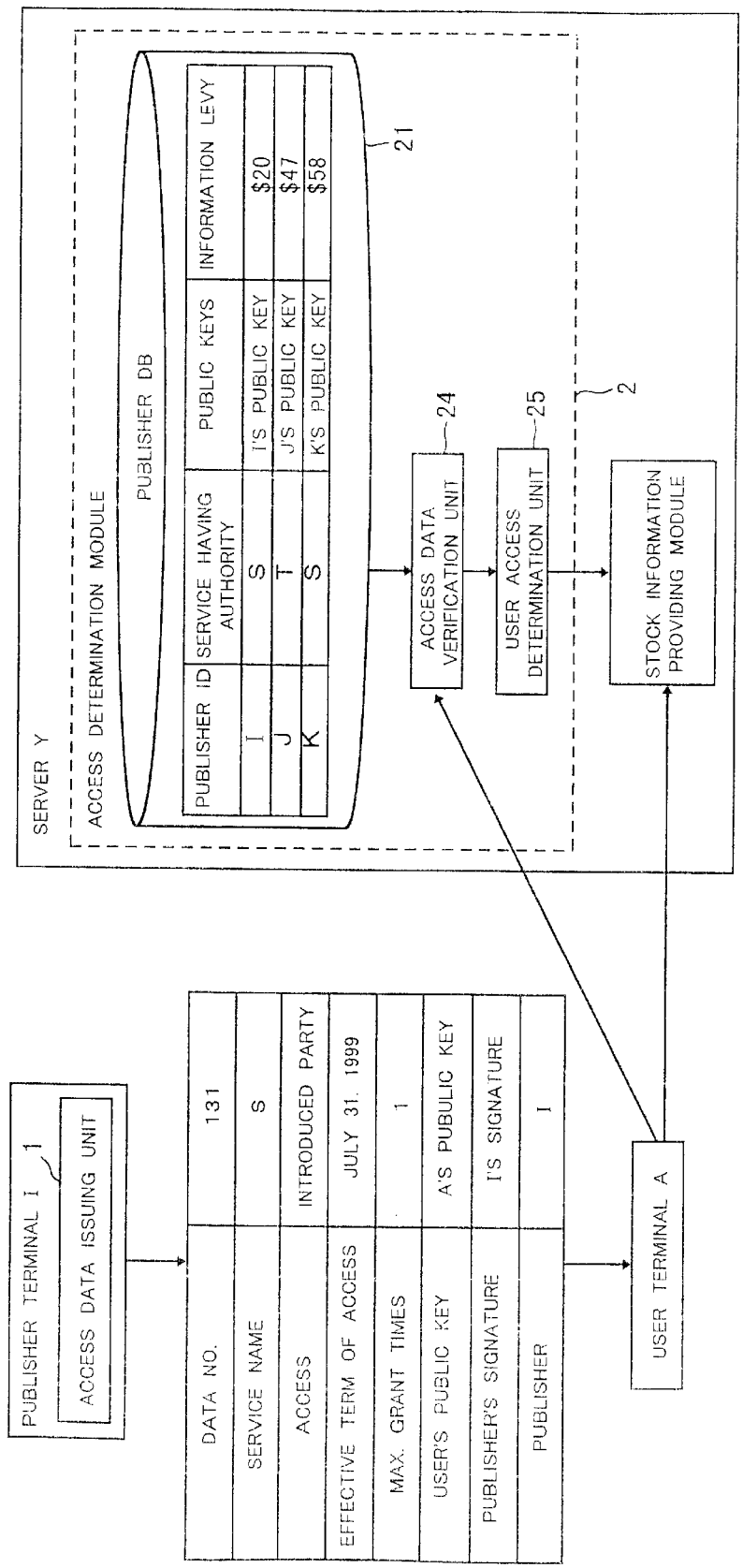
FIG. 9 is an explanatory view of various data in case an access administration system of the present invention is applied to a stock information service.

FIG. 9 shows a case where the present invention is applied to a paid internet service.

Identical reference numerals will be utilized to refer to the elements of this embodiment that correspond to the above-described embodiment. The embodiment herein uses the access data as a reference for the user. The server provides services to users who have the reference for free during a certain period of time. For a user who granted a reference to another user, the service fee for the grantor is discounted.

The system according to this embodiment is basically the same as the system according to that just described, except that the server Y of the present embodiment provides stock information instead of Web Pages. The present embodiment also differs in the following ways.

In this embodiment, the publisher who administers the publisher DB 21 in the server Y is also a user, in other words a registered user of a service S, which is provided from the server Y. Accordingly, the publisher DB 21 includes additional information such as service fees. In the publisher DB 21, the publisher ID also functions as the registered user ID for the service. In the publisher DB 21, "the authorized service" is registered in stead of "authorized Web Page."

The access data in this embodiment also differs in the following manner. The access data includes service names instead of URLs. Since the access data is used as a reference the access privilege designator includes such names as "referral."

In this embodiment, when the user A starts using the service as a referral, the service fee for the publisher I is discounted, identifying the publisher I from the publisher ID written in the access data, since the publisher I referred the user A to the service. Although registered users have to be registered at the service provision server Y, referrals do not need to register at the server Y to obtain right to use the service. Besides, users who made references can be rewarded easily.

Figure 10:
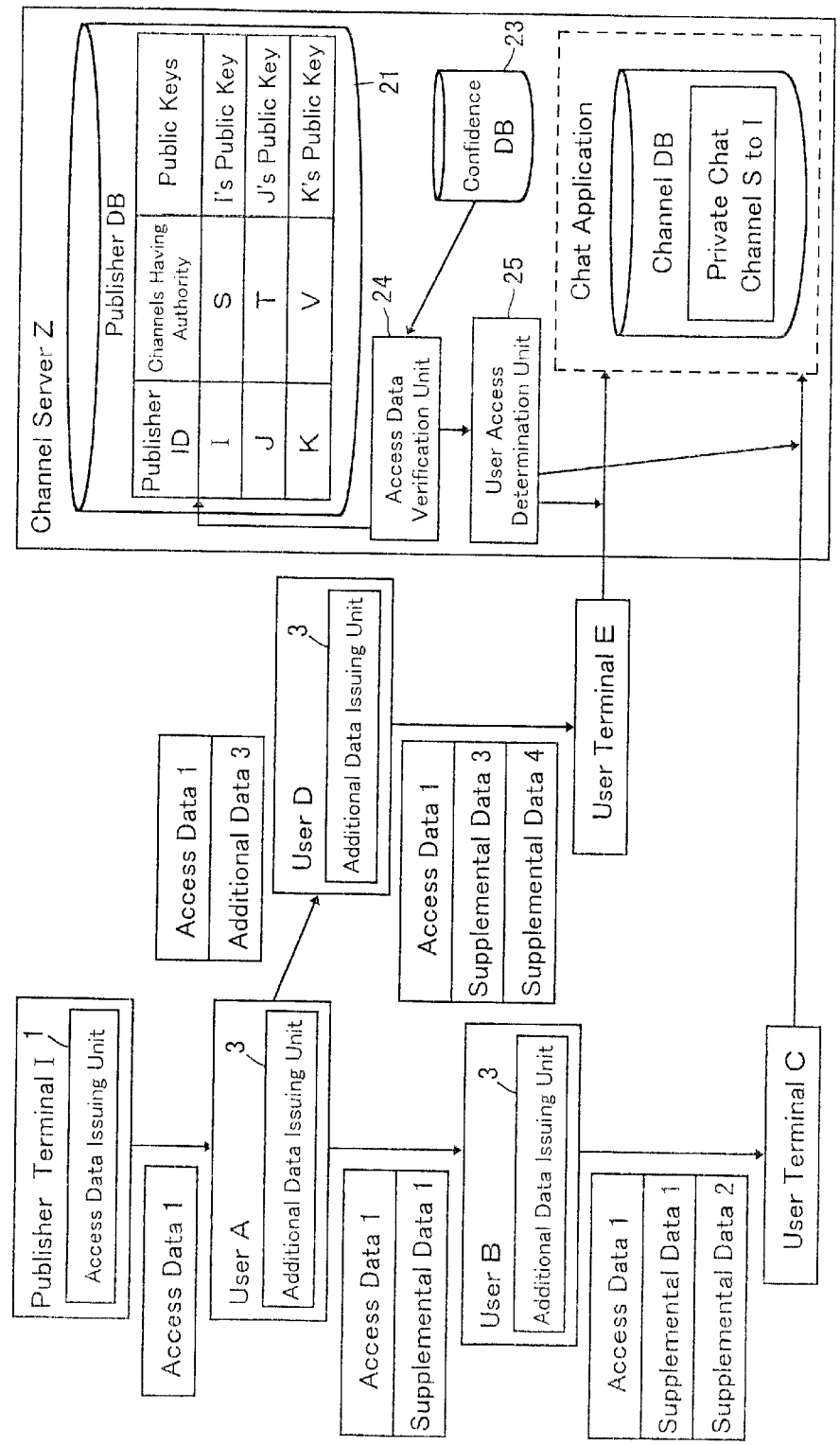
FIG. 10 is an explanatory view of various data in case an access administration system of the present invention is applied to a chat service.
Figure 11:
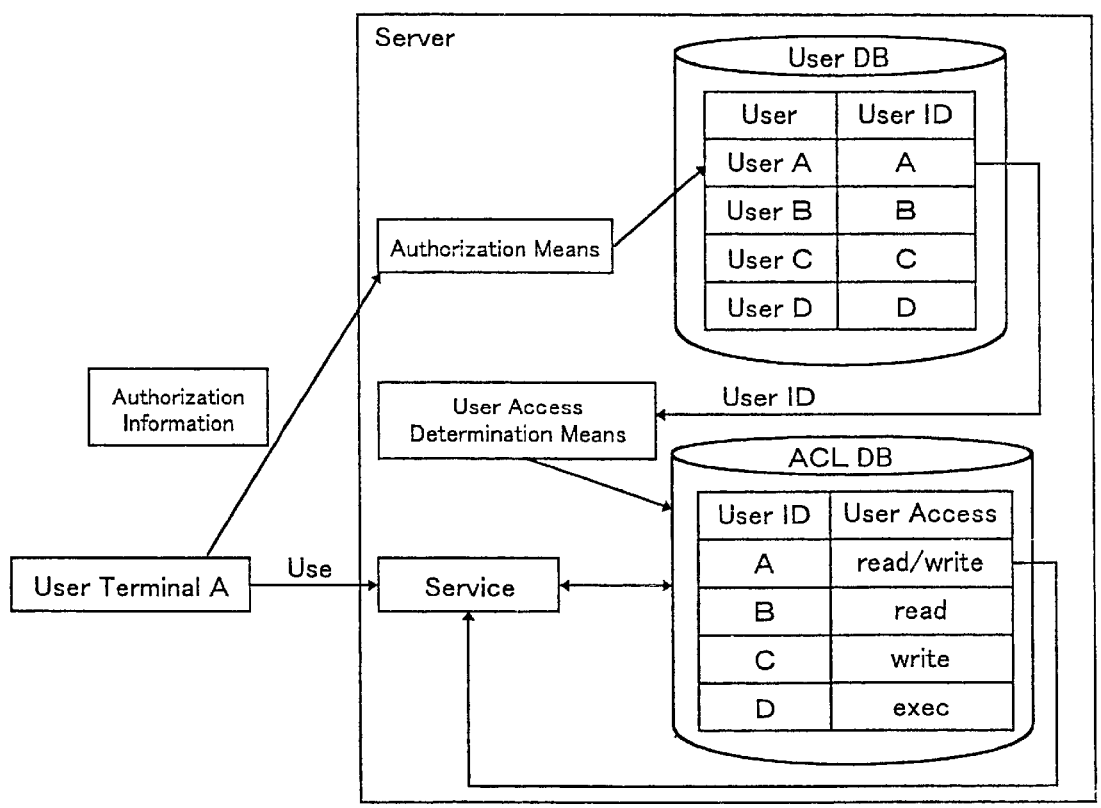
FIG. 11 is a view of an example of a conventional access administration system.
Figure 12:
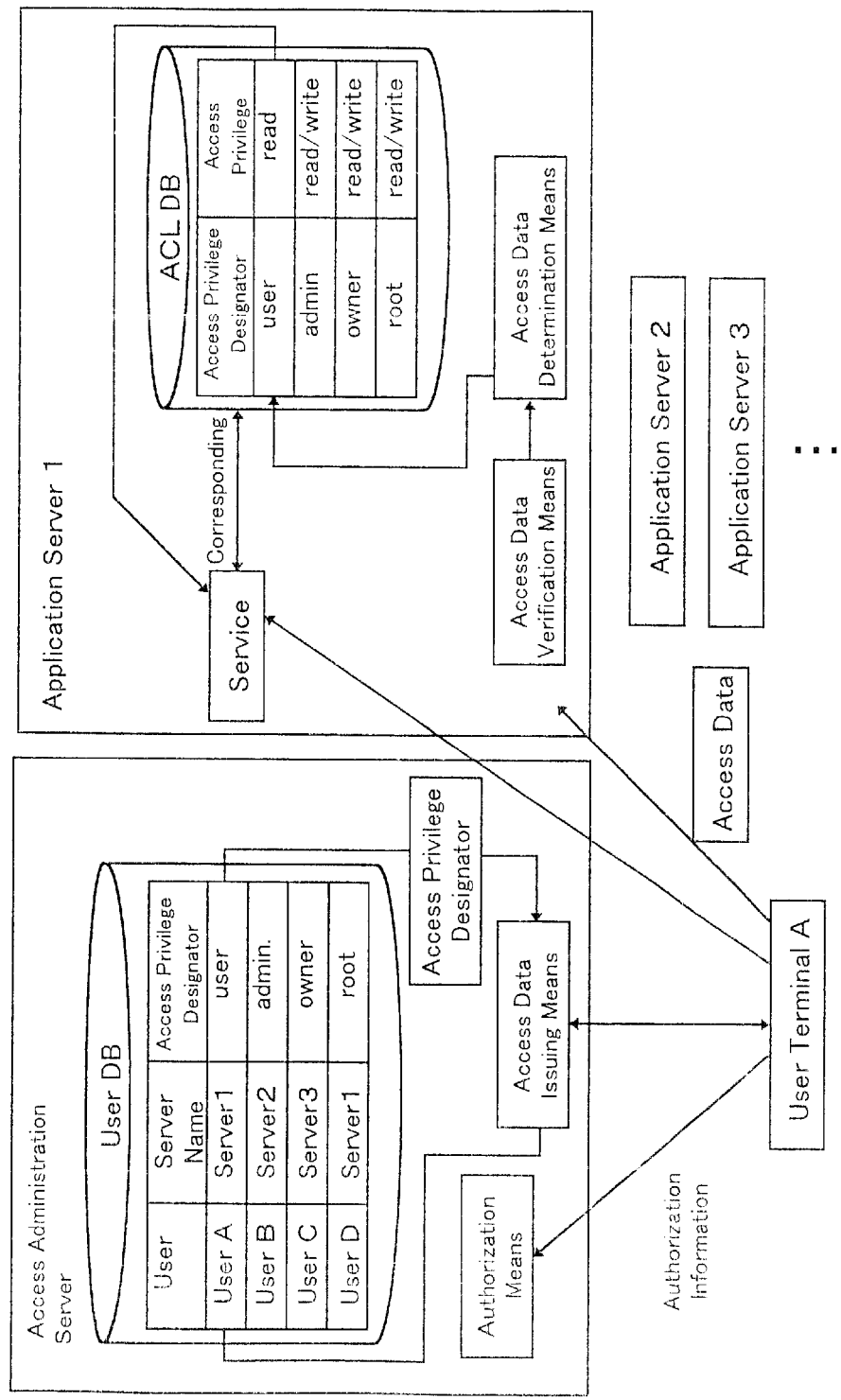
FIG. 12 is a view of an example of a conventional access administration system using an administration server.

FIG. 10 shows a structure in which a server that provides a chat service has an access determination module 2 and chat clients have access data issuing units. Identical reference numerals will be utilized to refer to the elements in FIG. 10 that correspond to the first-described embodiment. The chat server Z supports the chat service. The chat service herein means a service that allows simultaneous bi-directional communication among a plurality of user terminals which shares a common network. Since elemental functions are essentially the same in the foregoing embodiments, the description provided below is only an explanation that pertains to differences accruing from the fact that the service is a chat service.

As an example, here it is assumed that provision of a private channel during a chat session is controlled by the access determination module 2. Usually, when users who do not own the private channel request an access to the private channel, the owner of the private channel is called on. If the owner approves of the request, then a chat session through the private channel starts. In this embodiment, however, the owner does not have to be called upon, depending on the path through which the access data is distributed. In this embodiment, the system is configured such that the owner is called upon if the access data is distributed in order of the publisher I, other users A, D and E, and that the owner does not get called upon if the access data is distributed in order of the publisher I, other users A, B and C. A judgement as to whether the owner should be called upon or not is made in the following manner, based on the product of the confidence levels of the users, all the grantees, and the access privilege designator in the access data. If the access privilege designator in the access data is "friend", access is set as "friend A" if the product of the confidence is greater than 0.8, or "friend B" if the product of the confidence is smaller than 0.8. The friend A category and the friend B category are both authorized to access to the private channel, although the owner will not be called upon if she/he is busy in the case "the friend B" wishes an access.

In FIG. 10, the registered user ID for the service is used as a publisher ID that is to be registered at the publisher DB 21 of the server Z. The publisher owns and administers the private channel. Since the server Z provides chat services, "the authorized page" in the publisher DB 21 should instead be "the authorized channel."

When the user C accesses the private channel through the publisher I, and the users A and B, the product of the confidence levels of the users A, B, and C is 0.72, whereby access for the user C is "friend B." If the user D accesses the private channel through the publisher I and the user A, access for the user D is "friend A" since the product of the confidence levels of the users A and D is 0.9.

This embodiment allows for not only an easy granting of a usage category, but also an adjustment of services provided depending on the distribution path through which a user reaches the service.

Various details of the present invention may be changed without departing from its spirit nor its scope. Furthermore, the foregoing description of the embodiments according to the present invention are provided for illustration only, and not for the purpose of limiting the invention as defined by the appended claims and their equivalents.

What is claimed is:

1. Access data issuing device adapted to receive information for generating access data that defines an access for accessing a service that is offered on a computer network, thereby generating access data based on the received information and issuing the access data so as to be utilized on the computer network, wherein the access data comprises:

data identification information identifying each access data;

publisher identification information identifying a publisher;

service content specification information specifying a service content to which the publisher grants access data;

an access privilege designator being granted;

user verification information verifying legitimacy of a party to whom the access data is granted;

publisher verification information verifying the legitimacy of the publisher; and content verification information verifying the legitimacy of the content of the access data.

2. An access administration system for administering computer network service access privileges, said system for use in conjunction with a service provision module for providing publisher-issued services to terminals on a computer network, said access administration system comprising:

storing means for storing predetermined publisher information relating to publishers having authority to issue predetermined access data for the publisher-issued services;

verifying means for verifying received access data legitimacy based on the access data received and the publisher information;

access privilege determining means for determining access privileges based on the access data received and an access data legitimacy verification result, and for reporting the determined access privilege to the service provision module;

first issuing means for installation in an information terminal for a publisher, said first issuing means for preparing access data and for issuing the access data for utilization by the information terminal;

access submission means for submitting access data to said verifying means when a service from the service provision module is requested.

3. An access administration system as set forth in claim 2, further comprising:

second issuing means for installation in a terminal wherein the access data is utilizable in preparing predetermined supplemental data, appending the supplemental data to the access data, and issuing the supplemental-data appended access data for utilization by the information terminal;

wherein said verifying means verifies the legitimacy of the supplemental-data appended access data.

4. An access administration system as set forth in claim 2, further comprising:

invalid data storing means for storing access data invalidated by a publisher; and invalidation reporting means for reporting the invalidated access data to said invalid data storing means.

5. An access administration system as set forth in claim 2, further comprising:

confidence storing means for assigning to the publisher and other users a confidence level with respect to users other than said publisher and storing the confidence level; and confidence registering means for registering in said confidence storing means the confidence level with respect to users other than said publisher; wherein said verifying means further verifies the legitimacy of the access data based on access data-distributed user confidence level.

6. An access administration system as set forth in claim 2, wherein:

the access data includes information denoting an expiration date on which the access data expires; and the verifying means further verifies the legitimacy of the access data based on a date on which the service is requested in comparison with the expiration date.

7. An access administration system as set forth in claim 3, wherein:

the access data further includes a maximum number of parties which can utilize the access data; and the verifying means verifies the legitimacy of the access data based on a number of supplemental data added in comparison with the maximum number of parties which can utilize the access data.

8. An access administration system as set forth in claim 2, wherein the predetermined publisher information includes publisher identification information identifying the publisher of the access data; and verification information verifying the legitimacy of the access data.

9. An access administration system as set forth in claim 2, wherein the predetermined access data includes:

data identification information identifying the access data;

publisher identification information identifying the publisher;

service content specification information specifying a service content to which the publisher grants access data;

an access privilege designator being granted;

user verification information verifying the legitimacy of a user to whom the access data is granted;

publisher verification information verifying the legitimacy of the publisher; and content verification information verifying the legitimacy of the content of the access data.

10. An access administration system as set forth in claim 2, wherein the publisher information includes publisher identification information identifying the publisher of the access data and a public key that corresponds to a private key of the publisher according to a public key encryption system, or encryption information to obtain said public keys and the access data includes data identification information identifying the access data, said publisher identification information service content specification information specifying a service content to which the publisher grants access data an access privilege designator being granted, a public key that corresponds to a private key of the access data according to the public key encryption system, or encryption information to obtain said public key, and a digital signature of the publisher that is applied to said data identification information, said publisher identification information, said access privilege designator, and one of said public key and said encryption information, according to the public key encryption system.

11. An access administration system as set forth in claim 3, wherein the supplemental data includes grantor verification information verifying the legitimacy of a party who grants the access data, and grantee verification information verifying the legitimacy of a party to whom the access data is granted.

12. An access administration system as set forth in claim 11, wherein:

said grantor verification information is a digital signature of the party who grants the access data according to a public encryption key system; and said grantee verification information is a public key that corresponds to a private key of the party who grants the access data with the supplemental data appended thereto.

13. A supplemental data issuing device for receiving access data that defines an access privilege for accessing a service that is offered on a computer network, and information for generating a predetermined supplemental data, thereby generating a supplemental data based on the information and issuing a new access data from the access data received with a supplemental data appended thereto so as to be utilized by a terminal, wherein the supplemental data comprises:

grantor verification information verifying legitimacy of a party who grants the access data and the supplemental data; and grantee verification information verifying the legitimacy of a party to whom a license and the supplemental data are granted.

14. A computer-readable storage device having an access data issuing program, said access data issuing program being adapted to execute:

receiving information for generating access data that defines an access for accessing a service that is offered on a computer network, generating access data based on the received information, and issuing the access data so as to be utilized on the computer network, wherein the access data includes data identification information identifying the access data, publisher identification information identifying a publisher service content specification information specifying a service content to which the publisher grants a license, an access privilege designator being granted, user verification information verifying legitimacy of a party to whom the access data is granted, publisher verification information verifying the legitimacy of the publishers, and content verification information verifying the legitimacy of the content of the access data.

15. A computer-readable storage device having a data adding program, said data adding program being adapted to execute:

receiving access data that defines an access for accessing a service that is offered on a computer network, and information for generating a predetermined supplemental data;

generating a supplemental data based on the information; and issuing a new access data from the access data received and the supplemental data appended thereto so as to be utilized on a computer network; wherein the supplemental data includes grantor verification information verifying legitimacy of a party who grants the access data and the supplemental data, and grantee verification information verifying the legitimacy of a party to whom a license and the supplemental data are granted.

* * * * *

UNITED STATES PATENT AND TRADEMARK OFFICE
CERTIFICATE OF CORRECTION

PATENT NO. : 6,425,011 B1
DATED : July 23, 2002
INVENTOR(S) : Koji Otani et al.

It is certified that error appears in the above-identified patent and that said Letters Patent is hereby corrected as shown below:

Column 18,
Line 58, change "keys" to -- key --;
Line 62, after "information" insert -- , --;
Line 64, after "data" insert -- , --;

Column 20,
Line 10, after "publisher" insert -- , --.

Signed and Sealed this

Eleventh Day of February, 2003

JAMES E. ROGAN
*Director of the United States Patent and Trademark Office*